United States Patent
Lee et al.

(10) Patent No.: US 10,995,183 B2
(45) Date of Patent: May 4, 2021

(54) SUPERABSORBENT POLYMER AND PREPARATION METHOD THEREOF

(71) Applicant: LG Chem, Ltd., Seoul (KR)

(72) Inventors: Kum Hyoung Lee, Daejeon (KR); Gi Cheul Kim, Daejeon (KR); Sung Soo Park, Daejeon (KR); Ye Sol Yang, Daejeon (KR); Bo Hyun Seong, Daejeon (KR)

(73) Assignee: LG Chem, Ltd.

( * ) Notice: Subject to any disclaimer, the term of this patent is extended or adjusted under 35 U.S.C. 154(b) by 342 days.

(21) Appl. No.: 15/743,841

(22) PCT Filed: Nov. 4, 2016

(86) PCT No.: PCT/KR2016/012678
§ 371 (c)(1),
(2) Date: Jan. 11, 2018

(87) PCT Pub. No.: WO2017/011295
PCT Pub. Date: Jun. 29, 2017

(65) Prior Publication Data
US 2018/0194904 A1    Jul. 12, 2018

(30) Foreign Application Priority Data

Dec. 23, 2015 (KR) .................. 10-2015-0184614
Nov. 1, 2016 (KR) .................. 10-2016-0144603

(51) Int. Cl.
| | | |
|---|---|---|
| *C08J 3/075* | (2006.01) | |
| *C08J 9/08* | (2006.01) | |
| *C08J 3/24* | (2006.01) | |
| *C08K 3/36* | (2006.01) | |
| *C08K 5/00* | (2006.01) | |
| *C08F 20/56* | (2006.01) | |
| *C08L 57/10* | (2006.01) | |
| *C08L 33/02* | (2006.01) | |
| *C08F 20/06* | (2006.01) | |
| *C08F 220/06* | (2006.01) | |
| *C08J 9/00* | (2006.01) | |
| *C08J 9/10* | (2006.01) | |
| *C08L 35/00* | (2006.01) | |

(52) U.S. Cl.
CPC .............. *C08J 3/075* (2013.01); *C08F 20/06* (2013.01); *C08F 20/56* (2013.01); *C08F 220/06* (2013.01); *C08J 3/24* (2013.01); *C08J 9/0066* (2013.01); *C08J 9/08* (2013.01); *C08K 3/36* (2013.01); *C08K 5/0025* (2013.01); *C08L 33/02* (2013.01); *C08L 57/10* (2013.01); *C08F 2500/08* (2013.01); *C08F 2500/24* (2013.01); *C08F 2800/20* (2013.01); *C08J 9/10* (2013.01); *C08J 2201/026* (2013.01); *C08J 2203/02* (2013.01); *C08J 2205/022* (2013.01); *C08J 2333/02* (2013.01); *C08L 35/00* (2013.01)

(58) Field of Classification Search
CPC ........ C08F 20/06; C08F 20/56; C08F 220/06; C08F 2500/08; C08F 2500/24; C08F 2800/20; C08J 3/075; C08J 3/24; C08J 9/0066; C08J 9/08; C08J 9/10; C08J 2201/026; C08J 2203/02; C08J 2205/022; C08J 2333/02; C08K 3/36; C08K 5/0025; C08L 33/02; C08L 35/00; C08L 57/10
See application file for complete search history.

(56) References Cited

U.S. PATENT DOCUMENTS

| | | | |
|---|---|---|---|
| 4,446,261 A | 5/1984 | Yamasaki et al. | |
| 6,124,391 A | 9/2000 | Sun et al. | |
| 6,693,159 B1 * | 2/2004 | Holmes .................. | B01J 20/26 |
| | | | 526/323.1 |
| 2002/0040095 A1 | 4/2002 | Dairoku et al. | |
| 2005/0209352 A1 | 9/2005 | Dairoku et al. | |
| 2005/0214541 A1 | 9/2005 | Berrada et al. | |
| 2005/0239942 A1 | 10/2005 | Herfert et al. | |
| 2010/0100066 A1 | 4/2010 | Azad et al. | |
| 2012/0258851 A1 | 10/2012 | Nakatsuru et al. | |
| 2014/0197360 A1 | 7/2014 | Kitano et al. | |
| 2014/0364824 A1 | 12/2014 | Ota et al. | |
| 2014/0378926 A1 | 12/2014 | Ota et al. | |
| 2015/0210825 A1 | 7/2015 | Sadana et al. | |
| 2015/0273433 A1 | 10/2015 | Nakatsuru et al. | |
| 2015/0360204 A1 | 12/2015 | Tachi et al. | |

FOREIGN PATENT DOCUMENTS

| | | |
|---|---|---|
| JP | S56161408 A | 12/1981 |
| JP | S57158209 A | 9/1982 |
| JP | S57198714 A | 12/1982 |
| JP | 3979724 B2 | 9/2007 |
| JP | 2009061063 A | 3/2009 |
| JP | 2011068897 A | 4/2011 |
| JP | 4685017 B2 | 5/2011 |
| JP | 2012012482 A | 1/2012 |
| JP | 4926474 B2 | 5/2012 |
| JP | 2012217599 A | 11/2012 |
| KR | 20010072728 A | 7/2001 |
| KR | 20020003226 A | 1/2002 |
| KR | 20050036974 A | 4/2005 |
| KR | 100858387 B1 | 9/2008 |
| KR | 20110086057 A | 7/2011 |
| KR | 101160344 B1 | 6/2012 |
| KR | 20120132475 A | 12/2012 |

(Continued)

OTHER PUBLICATIONS

Kiaohua Qi et al., "Preparation and properties of macroporous superabsorbent composite", Polymers for Advanced Technologies, vol. 21, No. 3, Mar. 30, 2009, (2009) pp. 196-204, XP055494880.*

(Continued)

*Primary Examiner* — John M Cooney
(74) *Attorney, Agent, or Firm* — Lerner, David, Littenberg, Krumholz & Mentlik, LLP

(57) ABSTRACT

The present invention relates to a superabsorbent polymer having an improved adsorption rate and a high bulk density, and a preparation method thereof.

19 Claims, 1 Drawing Sheet

(56) References Cited

FOREIGN PATENT DOCUMENTS

| KR | 20140005208 A | 1/2014 |
|----|---------------|--------|
| KR | 20140107346 A | 9/2014 |
| KR | 20140107347 A | 9/2014 |
| KR | 20150067218 A | 6/2015 |
| KR | 20150113042 A | 10/2015 |

OTHER PUBLICATIONS

Schwalm, Reinhold, "UV Coatings: Basics, Recent Developments and New Applications", Elsevier Science (Dec. 21, 2006), p. 115.
Odian, George, "Principles of Polymerization", John Wiley & Sons, Inc. (1981), p. 203.
International Search Report for PCT/KR2016/012678 dated Feb. 13, 2017.

\* cited by examiner

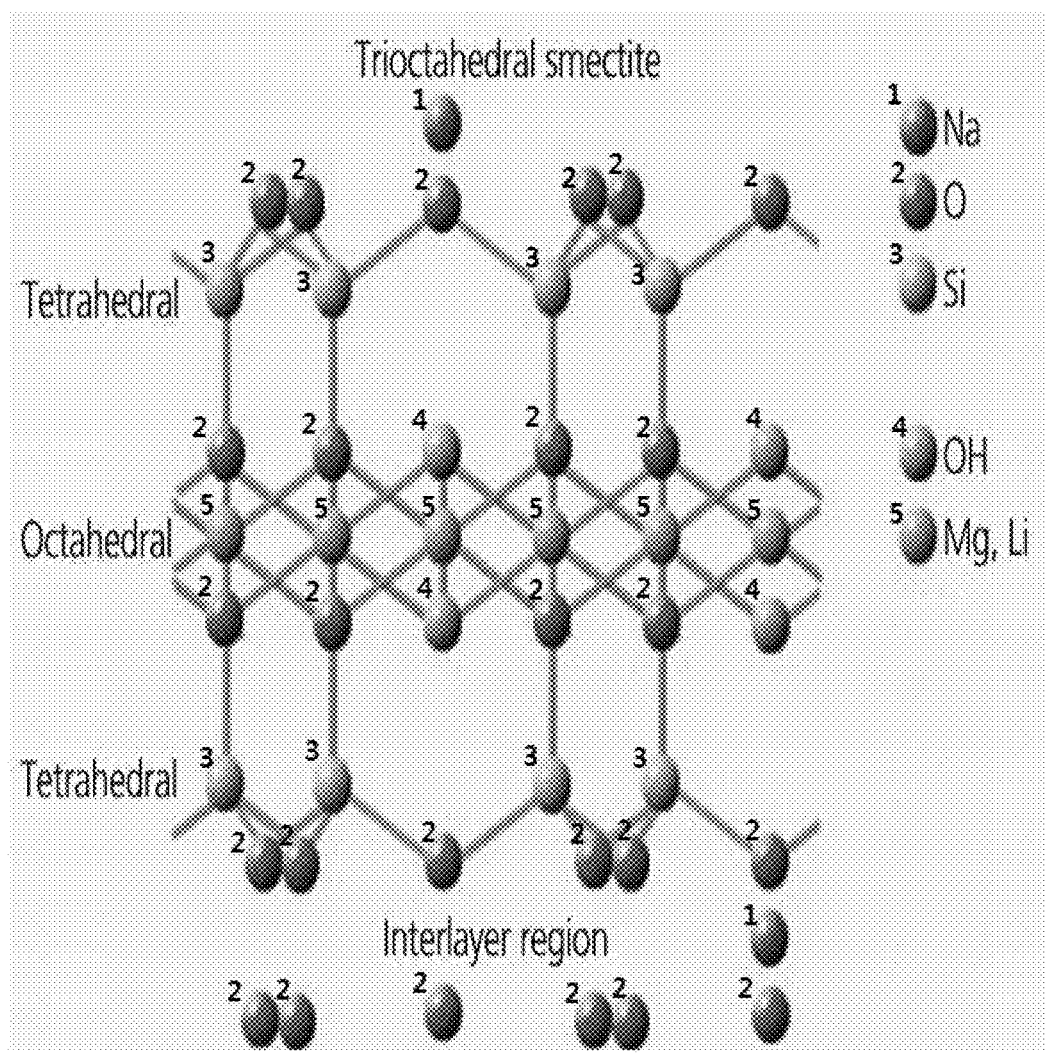

SUPERABSORBENT POLYMER AND PREPARATION METHOD THEREOF

CROSS-REFERENCE TO RELATED APPLICATION(S)

This application is a national phase entry under 35 U.S.C. § 371 of International Application No. PCT/KR2016/012678, filed Nov. 4, 2016, which claims priority to Korean Patent Application No. 10-2015-0184614, filed Dec. 23, 2015 and Korean Patent Application No. 10-2016-0144603 filed Nov. 1, 2016, Property Office, the disclosures of which are incorporated herein by reference.

TECHNICAL FIELD

The present invention relates to a superabsorbent polymer and a preparation method thereof. More specifically, the present invention relates to a superabsorbent polymer having an improved absorption rate and a high bulk density, and a preparation method thereof.

BACKGROUND ART

A superabsorbent polymer (SAP) is a synthetic polymer material capable of absorbing moisture from about 500 to about 1000 times its own weight, and manufacturers have given it different names, such as SAM (SuperAbsorbent Material), AGM (Absorbent Gel Material) and the like. Such superabsorbent polymers were initially practically applied in sanitary products, and now they are widely used for preparation of various products, for example, hygiene products such as paper diapers for children or sanitary napkins, water retaining soil products for gardening, water stop materials for civil engineering and construction, sheets for raising seedlings, fresh-keeping agents for food distribution fields, materials for poultices, and the like.

As a method for preparing such a superabsorbent polymer, an inverse suspension polymerization method, an aqueous solution polymerization method, and the like are known. Among them, the preparation of superabsorbent polymers via inverse suspension polymerization is disclosed in Japanese Patent Publication Nos. Sho56-161408, Sho57-158209, Sho57-198714, and so on. Furthermore, for the preparation of superabsorbent polymers via aqueous solution polymerization, a thermal polymerization method of polymerizing a hydrogel polymer while breaking and cooling the same in a kneader equipped with a plurality of spindles, and a photo-polymerization method of exposing a highly concentrated aqueous solution to UV rays or the like on a belt so as to carry out the polymerization and drying at the same time are known.

On the other hand, the absorption rate, one of important physical properties of superabsorbent polymers, is associated with the surface dryness of the product in contact with skin, such as with disposable diapers. In general, the absorption rate can be improved in a manner of widening a surface area of the superabsorbent polymer.

As an example, a method of forming a porous structure on a particle surface of the superabsorbent polymer by using a blowing agent has been applied. However, general blowing agents have a disadvantage in that a sufficient amount of the porous structure cannot be formed and thus the absorption rate is not highly increased.

As another example, there is a method for increasing a surface area of the superabsorbent polymer by reassembling fine particles obtained during preparation of the superabsorbent polymer to form porous particles with irregular shapes. However, although the absorption rate of the superabsorbent polymer can be improved through this method, there is a limit in that centrifuge retention capacity (CRC) and absorbency under pressure (AUP) of the polymer are relatively decreased. In this way, because physical properties such as absorption rate, centrifuge retention capacity, and absorbency under pressure of the superabsorbent polymer have a trade-off relationship, there is an urgent need for a preparation method capable of simultaneously improving these properties.

PRIOR ART LITERATURE

Patent Document (Patent document 1) Japanese Patent Laid-open Publication No. Sho 56-161408
(Patent document 2) Japanese Patent Laid-open Publication No. Sho 57-158209
(Patent document 3) Japanese Patent Laid-open Publication No. Sho 57-198714

DETAILED DESCRIPTION OF THE INVENTION

Technical Problem

It is one object of the present invention to provide a superabsorbent polymer having an improved absorption rate and a high bulk density.

It is another object of the present invention to provide a method for preparing the superabsorbent polymer.

Technical Solution

In the present specification, a superabsorbent polymer is provided, which includes a base polymer powder containing a crosslinked polymer of a water-soluble ethylenically unsaturated monomer having an acidic group in which at least a part thereof is neutralized, wherein a plurality of pores having a diameter of 1 μm or greater are formed in the base polymer powder, wherein the crosslinked polymer includes a layered silicate-based particle dispersed in the crosslinked structure, and wherein the superabsorbent polymer has an bulk density of 0.55 g/ml or greater.

Further, in the present specification, there a superabsorbent polymer is provided, which includes a base polymer powder containing a crosslinked polymer of a water-soluble ethylenically unsaturated monomer having an acidic group in which at least a part thereof is neutralized, wherein a plurality of pores having a diameter of 1 μm or greater are formed in the base polymer powder, wherein the superabsorbent polymer has a bulk density of 0.55 g/ml or greater, and wherein a time required to remove a vortex generated by stirring 50 ml of a 0.9 wt % NaCl solution at a rate of 600 rpm is 54 seconds or less.

Furthermore, in the present specification, a method for preparing a superabsorbent polymer is provided, including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a rate of 1000 rpm or greater, to prepare a hydrogel polymer; and drying, pulverizing, and classifying the hydrogel polymer to form a base polymer powder, wherein the concentration of the water-soluble ethylenically unsaturated monomer contained in the monomer composition is 40% by weight to 60% by weight.

In addition, in the present specification, a method for preparing a superabsorbent polymer is provided, including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a rate of 1000 rpm or greater to prepare a hydrogel polymer; and drying, pulverizing, and classifying the hydrogel polymer to form a base polymer powder, wherein the step of drying, pulverizing, and classifying the hydrogel polymer to form a base polymer powder includes a course pulverization step of pulverizing the hydrogel polymer so that the particle diameter thereof is 2 mm to 10 mm, and wherein the course pulverizing step is carried out at a temperature of 50° C. or greater at a frequency of 15 Hz or greater.

Moreover, in the present specification, a method for preparing a superabsorbent polymer is provided, including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a rate of 1000 rpm or greater, to prepare a hydrogel polymer; and drying, pulverizing, and classifying the hydrogel polymer to form a base polymer powder, wherein the step of drying, pulverizing and classifying the hydrogel polymer to form a base polymer powder includes a course pulverization step of pulverizing the hydrogel polymer so that the particle diameter thereof is 2 mm to 10 mm, and wherein the method further includes, before or after the course pulverization, a step of adding water in an amount of less than 20 parts by weight based on 100 parts by weight of the hydrogel polymer.

Hereinafter, the superabsorbent polymer and the preparation method thereof according to specific embodiments of the present invention will be described in more detail.

Unless otherwise particularly defined in the entire present specification, it will be understood that the term "comprise", "include", or "contain" refers to including certain elements (or components) without any particular limitation, and cannot be interpreted to preclude the addition of other elements (or components).

In the present specification, a (meth)acryl refers to including both acryl and methacryl.

According to one embodiment of the present invention, a superabsorbent polymer may be provided, which includes a base polymer powder containing a crosslinked polymer of a water-soluble ethylenically unsaturated monomer having an acidic group in which at least a part thereof is neutralized, wherein a plurality of pores having a diameter of 1 μm or greater are formed in the base polymer powder, wherein the crosslinked polymer includes a layered silicate-based particle dispersed in the crosslinked structure, and wherein the superabsorbent polymer has an bulk density of 0.55 g/ml or greater.

The present inventors found through experiments that, when using the superabsorbent polymer described above, as specific layered silicate-based particles are used, a plurality of micropores can be stably formed in a crosslinked polymer, which rapidly increases the contact area with water, thereby further improving the absorption area of the superabsorbent polymer and preparing a superabsorbent polymer having a high bulk density. The present invention was completed on the basis of such finding.

Specifically, the superabsorbent polymer may include a base polymer powder containing a crosslinked polymer of a water-soluble ethylenically unsaturated monomer having an acidic group in which at least a part thereof is neutralized. As used herein, the "water-soluble ethylenically unsaturated monomer" includes all of a polymer obtained by drying the hydrogel polymer, a polymer obtained by pulverizing the hydrogel polymer or the dried polymer, a polymer before performing a surface crosslinking reaction, or a polymer after performing a surface crosslinking reaction according to a general method of preparing the superabsorbent polymer, as well as a hydrogel polymer formed immediately after thermal polymerization or photopolymerization of a monomer composition. As long as the polymer is a one resulting from polymerization of water-soluble ethylenically unsaturated monomers, any polymer can be included regardless of its shape, moisture content, particle size, surface crosslinking, etc.

The superabsorbent polymer of one embodiment includes, as a base polymer powder, a polymer crosslinked with the water-soluble ethylenically unsaturated monomer, as in the case of a conventional superabsorbent polymer.

In the superabsorbent polymer of the above-described embodiment, examples of the water-soluble ethylenically unsaturated monomer include at least one selected from the group consisting of anionic monomers such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methylpropane sulfonic acid, and salts thereof; non-ionic hydrophilic monomers such as (meth)acrylamide, N-substituted (meth)acrylate, 2-hydroxyethyl(meth)acrylate, 2-hydroxypropyl (meth) acrylate, methoxypolyethylene glycol (meth)acrylate, and polyethylene glycol (meth)acrylate; and amino group-containing unsaturated monomers such as (N,N)-dimethylaminoethyl (meth)acrylate and (N,N)-dimethylaminopropyl (meth)acrylamide, and a quaternary compound thereof. Among these, acrylic acid or a salt thereof, for example, an alkali metal salt such as acrylic acid in which at least a part of the acrylic acid is neutralized, and/or a sodium salt thereof, can be used. By using such monomer, it becomes possible to prepare a superabsorbent polymer having excellent physical properties. In the case wherein the alkali metal salt of the acrylic acid is used as the monomer, it is possible to use acrylic acid after neutralizing the same with a basic compound such as caustic soda (NaOH).

Further, the crosslinked polymer contained in the base polymer powder may include a crosslinked structure in which polymer chains of the water-soluble ethylenically unsaturated monomer are crosslinked through a cross-linkable functional group of an internal crosslinking agent. As an internal crosslinking agent for introducing the basic crosslinked structure into the crosslinked polymer and the base polymer powder, any internal crosslinking agent having a cross-linkable functional group previously used for the preparation of a superabsorbent polymer can be used without particular limitation. However, in order to improve the physical properties of the superabsorbent polymer by introducing an appropriate crosslinking structure into the base polymer powder, a polyfunctional acrylate compound having a plurality of ethylene oxide groups may be used as an internal crosslinking agent. More specific examples of such internal crosslinking agent include at least one selected from the group consisting of polyethylene glycol diacrylate (PEGDA), glycerin diacrylate, glycerin triacrylate, unmodified or ethoxylated trimethylolpropane triacrylate (TMPTA), hexanediol diacrylate, and triethylene glycol diacrylate.

Meanwhile, a plurality of pores having a diameter of 1 μm or greater, 1 μm to 10 mm, or 1 μm to 1000 μm may be formed in the base polymer powder. As shown in the method for preparing a superabsorbent polymer described below, the pores are implemented by the foaming agent added together in the monomer composition. It can be confirmed that the plurality of pores having a minimum diameter of 1 μm or greater are formed on the base powder. The pores may be a plurality of numbers and can exist in a uniformly dispersed form inside the base polymer powder.

In particular, among the plurality of pores having a diameter of 1 μm or greater included in the base polymer powder, micropores having a diameter of 10 μm to 100 μm may be included. The micropores having a diameter of 10 μm to 100 μm may be formed as the foaming agent is added together with inorganic particles when forming the polymer, as described below. As the micropores are stably formed, the contact area with water is increased, thereby further improving the absorption rate of the superabsorbent polymer.

Further, the crosslinked polymer included in the base polymer powder may include a layered silicate-based particle dispersed in the crosslinked structure thereof. As the layered silicate-based particle, a particle containing a unit crystal which include a metal oxide layer containing a metal oxide, and a silica layer containing silica which is formed on at least one surface of the metal oxide layer, may be used.

The unit crystal refers to a periodic unit of a crystalline particle having three-dimensional periodicity, and a particle can be formed through the amalgamation of the unit crystals.

The unit crystals of the layered silicate-based particles may include a metal oxide layer containing a metal oxide, and a silica layer containing silica which is formed on at least one surface of the metal oxide layer. That is, a silica layer may be formed on one side or both sides of the metal oxide layer in the unit crystals of the layer of silicate-based particles.

Specifically, the metal oxide layer and the silica layer may be bonded through a siloxane bond. The siloxane bond refers to a covalent bond between a silicon atom (Si) and an oxygen atom (O), and more specifically, similarly to the unit crystal structure shown in FIG. 1, the bond between the metal oxide and the silica layer may be formed through a covalent bond between oxygen atoms included in the metal oxide layer and silicon atoms included in the silica layer.

In the metal oxide layer, the metal oxide may exist in a state in which a metal atom and an oxygen atom are bonded. Examples of the metal atom are not limited, but include lithium, sodium, potassium, beryllium, magnesium, calcium, and the like, which are Group 1 or Group 2 elements in the periodic table.

Accordingly, the layered silicate-based particles can stably maintain the micropores in the crosslinked polymer and thus increase the contact area with water, thereby further improving the absorption rate of the superabsorbent polymer.

The layered silicate-based particles may have a columnar structure in which the maximum diameter of the orthogonal cross-section is 1 nm to 100 nm and the height is 0.01 nm to 20 nm or 0.1 nm to 20 nm. The columnar structure refers to a three-dimensional figure whose upper and lower surfaces are parallel to each other. Although the specific form of the columnar structure is not limited, for example, it can include a circular, elliptical, or polygonal column, or the like, depending on the type of the cross-section in which the layered silicate-based particles are cut in the direction parallel to the ground, that is, depending on the types of figures in which the orthogonal cross-section appears.

As described above, the columnar structure of the layered silicate-based particles can be formed through the amalgamation of the unit crystals, and the maximum diameter of the orthogonal cross-section in the columnar structure refers to the largest diameter value resulting from a cross-section in which the layered silicate-based particles are cut in the direction parallel to the ground.

In this way, as the layered silicate-based particles have a columnar structure in which the maximum diameter of the orthogonal cross-section is 1 nm to 100 nm and the height is 0.01 nm to 20 nm, the layered silicate-based particles in the crosslinked polymer of one embodiment can not only implement functionality in the crosslinked polymer through a microparticle size, but can also stabilize the micropores formed by the foaming agent in the monomer composition upon formation of the crosslinked polymer.

Examples of the layered silicate-based particles are not particularly limited, but for example, hectorite (Laponite RD, Laponite XLG, Laponite D, Laponite DF, Laponite RS, Laponite XLS, Laponite DS, Laponite S, Laponite JS, etc.) may be mentioned, and the more preferable example thereof is Laponite RD.

Further, the above-described layered silicate-based particles may be contained in an amount of 0.01 parts by weight to 30 parts by weight, or 0.01 parts by weight to 5 parts by weight, or 0.01 parts by weight to 0.1 parts by weight based on 100 parts by weight of the base polymer powder. Accordingly, the degree of formation of micropores in the crosslinked polymer is optimized, and thus the superabsorbent polymer of one embodiment can have an improved absorption rate.

Specifically, the superabsorbent polymer of one embodiment may have a bulk density (B/D) of 0.55 g/ml or greater, 0.55 g/ml to 1.0 g/ml, or 0.55 g/ml to 0.70 g/ml. If the bulk density of the superabsorbent polymer is excessively reduced to less than 0.55 g/ml, the volume of the superabsorbent polymer is relatively increased, so more storage space is required which may lead to a reduction in storage efficiency. Further, when the superabsorbent polymer is applied to a manufacturing process of diapers or the like, the superabsorbent polymer particles are stagnated rather than being smoothly injected, thereby reducing the efficiency of the process.

In addition, in the superabsorbent polymer of one embodiment, the time required to remove the vortex generated by stirring 50 ml of a 0.9 wt % NaCl solution at a rate of 600 rpm can be 60 seconds or less, or 40 seconds to 60 seconds.

Moreover, in the superabsorbent polymer of one embodiment, a retention capacity for a physiological saline solution as measured according to the EDANA method No. WSP 241.2 can be 40 g/g or greater, or 40 g/g to 60 g/g. The centrifuge retention capacity (CRC) for a physiological saline solution may be measured according to the EDANA method No. WSP 241.2 method. More specifically, the retention capacity can be calculated by the following Calculation Formula 1 after absorbing a physiological saline solution in the superabsorbent polymer into over 30 minutes.

$$CRC(g/g) = \{[W_2(g) - W_1(g)]/W_0(g)\} - 1 \quad \text{[Calculation Formula 1]}$$

In the above Calculation Formula 1, $W_0(g)$ is an initial weight (g) of the superabsorbent polymer, $W_1(g)$ is the weight of the apparatus without the superabsorbent polymer measured after dehydration by using a centrifuge at 250 G for 3 minutes, and $W_2(g)$ is the weight of the apparatus including the superabsorbent polymer measured after immersing and absorbing a 0.9 wt % physiological saline solution into the superabsorbent polymer at room temperature for 30 minutes and then dehydrating the same by using a centrifuge at 250 G for 3 minutes.

Further, the superabsorbent polymer of the above-described embodiment may have a particle shape such as a spherical shape or an amorphous shape having a particle diameter of about 150 μm to 850 μm.

According to another embodiment of the present invention, a superabsorbent polymer may be provided, which includes a base polymer powder containing a crosslinked polymer of a water-soluble ethylenically unsaturated monomer having an acidic group in which at least a part thereof is neutralized, wherein a plurality of pores having a diameter of 1 μm or greater are formed in the base polymer powder, wherein the superabsorbent polymer has a bulk density of 0.55 g/ml or greater, and wherein the time required to remove a vortex generated by stirring 50 ml of a 0.9 wt % NaCl solution a rate of 600 rpm is 54 seconds or less.

The details included in the present embodiment may include all of the details described in the previous embodiment.

According to another embodiment of the present invention, a method for preparing a superabsorbent polymer may be provided, including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a rate of 1000 rpm or greater, to prepare a hydrogel polymer; and drying, pulverizing, and classifying the hydrogel polymer to form a base polymer powder, wherein the concentration of the water-soluble ethylenically unsaturated monomer contained in the monomer composition is 40% by weight to 60% by weight.

Further, a method for preparing a superabsorbent polymer may be provided, including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a rate of 1000 rpm or greater, to prepare a hydrogel polymer; and drying, pulverizing, and classifying the hydrogel polymer to form a base polymer powder, wherein the step of drying, pulverizing, and classifying the hydrogel polymer to form a base polymer powder includes a course pulverization step of pulverizing the hydrogel polymer so that the particle diameter thereof is 2 mm to 10 mm, and wherein the course pulverizing step is carried out at a temperature of 50° C. or greater at a frequency of 15 Hz or greater.

Furthermore, a method for preparing a superabsorbent polymer may be provided, including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a rate of 1000 rpm or greater, to prepare a hydrogel polymer; and drying, pulverizing, and classifying the hydrogel polymer to form a base polymer powder, wherein the step of drying, pulverizing, and classifying the hydrogel polymer to form a base polymer powder includes a course pulverization step of pulverizing the hydrogel polymer so that the particle diameter thereof is 2 mm to 10 mm, and wherein the method further includes, before or after the course pulverization, a step of adding water in an amount of less than 20 parts by weight based on 100 parts by weight of the hydrogel polymer.

In such preparation methods of still another embodiment, the superabsorbent polymer can be prepared by carrying out crosslinking of a water-soluble ethylenically unsaturated monomer by using the layered silicate-based particles together with a conventional foaming agent and an internal crosslinking agent, and subsequently carrying out drying, pulverizing, classifying, and surface crosslinking thereof according to a general preparation method of a superabsorbent polymer. As such, in the crosslinking step of the water-soluble ethylenically unsaturated monomer, as the layered silicate-based particles and the foaming agent are used together, the micro bubbles generated by the foaming agent can be stably maintained by the layered silicate-based particles, and thus the absorption rate of the superabsorbent polymer to be finally prepared can be further improved, and it is possible to prepare a base polymer powder into which the crosslinking structure already formed is introduced by the use of the internal crosslinking agent, and thus various physical properties such as excellent retention capacity and the like can be implemented.

In particular, in the preparation method of the superabsorbent polymer of still another embodiment, as the monomer composition containing a layered silicate-based particle, a foaming agent, an internal crosslinking agent, and a water-soluble ethylenically unsaturated monomer having an acidic group in which at least a part thereof is neutralized is stirred at a rate of 1000 rpm or greater, 1000 rpm to 20,000 rpm, 1000 rpm to 10,000 rpm, or 500 rpm to 7000 rpm, a high shear force can be applied to the monomer composition, and thus it is possible to inhibit the formation of macropores having a size of several millimeters to several tens of millimeters in the base polymer powder as much as possible and to distribute a large number of micropores having a diameter of 10 μm to 100 μm.

In addition, the monomer composition is stirred at a rate of 1000 rpm or greater, followed by either 1) adjusting the concentration of the water-soluble ethylenically unsaturated monomer included in the monomer composition to 40% by weight to 60% by weight, or 2) carrying out a coarse pulverization step at a temperature of 50° C. or greater and a frequency of 15 Hz or greater, or 3) adding water in an amount of less than 20 parts by weight based on 100 parts by weight of the hydrogel polymer, before or after the course pulverization step, thereby reducing non-uniformity of the shape of the superabsorbent polymer particles, and increasing the bulk density of the superabsorbent polymer.

Specifically, the preparation method of the superabsorbent polymer may include a step of crosslinking the monomer composition which contains a layered silicate-based particle, a foaming agent, and an internal crosslinking agent, and a water-soluble ethylenically unsaturated monomer having an acidic group in which at least a part thereof is neutralized, and which is stirred at a rate of 1000 rpm or greater, to prepare a hydrogel polymer.

Examples of the method for preparing the monomer composition is not particularly limited, but include, for example, a method for simultaneously or sequentially mixing the layered silicate-based particles, the foaming agent, the internal crosslinking agent, and the water-soluble ethylenically unsaturated monomer having an acidic group in which at least a part thereof is neutralized. More specifically, the method may include a process of preparing a first mixture in which a water-soluble ethylenically unsaturated monomer and an internal crosslinking agent are mixed and a second mixture in which a layered silicate-based particle and a foaming agent are mixed, and then mixing the first mixture and the second mixture, and the like.

The monomer composition may be stirred at a rate of 1000 rpm or more, or 1000 rpm to 20,000 rpm, or 3000 rpm to 10.000 rpm. By the high-rate stirring, a high shear force can be applied to the monomer composition, and thus it is possible to inhibit the formation of macropores having a size of several millimeters to several tens of millimeters in the base polymer powder as much as possible and to distribute a large number of micropores having a diameter of 10 μm to 100 μm.

More specifically, while examples of the method of stirring the monomer composition are not particularly limited, they may include a method of passing the monomer composition through a dynamic mechanical system (DMS). The dynamic mechanical system (DMS) includes a pump and a stirrer, and the pump has a motor speed of 0 to 6000 rpm, and a stirring rate may be 0 to 20,000 rpm.

As the layered silicate-based particle, a particle including a unit crystal which contains a metal oxide layer containing a metal oxide, and a silica layer containing silica which is formed on at least one surface of the metal oxide layer, may be used.

The unit crystal refers to a periodic unit of a crystalline particle having three-dimensional periodicity, and particles can be formed through the amalgamation of the unit crystals.

The unit crystals of the layered silicate-based particles may include a metal oxide layer containing a metal oxide, and a silica layer containing silica which is formed on at least one surface of the metal oxide layer. That is, a silica layer may be formed on one side or both sides of the metal oxide layer in the unit crystals of the layer of silicate-based particles.

Specifically, the metal oxide layer and the silica layer may be bonded through a siloxane bond. The siloxane bond refers to a covalent bond between a silicon atom (Si) and an oxygen atom (O), and more specifically, similarly to the unit crystal structure shown in FIG. 1, the bond between the metal oxide and the silica layer may be formed through a covalent bond between oxygen atoms included in the metal oxide layer and silicon atoms included in the silica layer.

In the metal oxide layer, the metal oxide may exist in a state in which a metal atom and an oxygen atom are bonded. Examples of the metal atom are not particularly limited, and may include lithium, sodium, potassium, beryllium, magnesium, calcium, and the like, which are Group 1 or Group 2 elements in the periodic table.

The layered silicate-based particles may have a columnar structure in which the maximum diameter of the orthogonal cross-section is 1 nm to 100 nm and the height is 0.01 nm to 20 nm or 0.1 nm to 20 nm. The columnar structure refers to a three-dimensional figure in which the upper and lower surfaces are parallel to each other. Although the specific form of the columnar structure is not limited, for example, it can include a circular, elliptical, or polygonal column, or the like, depending on the type of the cross-section in which the layered silicate-based particles are cut in the direction parallel to the ground, that is, depending on the types of figures in which the orthogonal cross-section appears.

As described above, the columnar structure of the layered silicate-based particles can be formed through the amalgamation of the unit crystals, and the maximum diameter of the orthogonal cross-section refers to the largest diameter value resulting from a cross-section in which the layered silicate-based particles are cut in the direction parallel to the ground.

In this way, as the layered silicate-based particles have a columnar structure in which the maximum diameter of the orthogonal cross-section is 1 nm to 100 nm and the height is 0.01 nm to 20 nm, the layered silicate-based particles in the crosslinked polymer of one embodiment can not only implement functionality in the crosslinked polymer through a microparticle size, but can also stabilize the micropores formed by the foaming agent in the monomer composition upon formation of the crosslinked polymer.

Examples of the layered silicate-based particles are not particularly limited, but for example, hectorite (Laponite RD, Laponite XLG, Laponite D, Laponite DF, Laponite RS, Laponite XLS, Laponite DS, Laponite S, Laponite JS, etc.) may be mentioned, and the more preferable example thereof is Laponite RD.

Examples of the foaming agent is not particularly limited, but various foaming agents widely known in the art may be used without limitation. Specifically, for example, at least one selected from the group consisting of azodicarbonamide, azodicarboxylamide, benzenesulfonyl hydrazide, dinitrosopentamethylenetetramine, toluenesulfonyl hydrazide, azobisisobutyronitrile, barium azodicarboxylate, and sodium bicarbonate may be mentioned.

As described above, the step of crosslinking a water-soluble ethylenically unsaturated monomer having an acidic group in which at least a part thereof is neutralized to form a hydrogel polymer can be carried out in the presence of layered silicate-based particles, a foaming agent, and an internal crosslinking agent. That is, it may be a step of polymerizing a monomer composition containing the layered silicate-based particles, the foaming agent, the internal crosslinking agent, and the water-soluble ethylenically unsaturated monomer having an acidic group in which at least a part thereof is neutralized.

As such, instead of forming the hydrogel polymer and then adding the layered silicate-based particles, the foaming agent, and the like, micropores can be formed even in the hydrogel polymer by adding the layered silicate-based particles and the foaming agent to form a monomer composition for forming a hydrogel polymer.

Herein, in the monomer composition including the layered silicate-based particles, the foaming agent, the internal crosslinking agent, and the water-soluble ethylenically unsaturated monomer having an acidic group in which at least a part thereof is neutralized, the content of the layer of silicate-based particles may be 1 part by weight to 50 parts by weight based on 100 parts by weight of the foaming agent.

If the content of the layer of silicate-based particles is excessively reduced to less than 1 part by weight based on 100 parts by weight of the foaming agent, the pore-stabilizing effect due to the layer of silicate-based particles is reduced, thereby reducing the absorption capacity of the superabsorbent polymer.

The type and structure of the internal crosslinking agent and the water-soluble ethylenically unsaturated monomer are as described above, and thus a further explanation thereof will be omitted.

Meanwhile, in the step of forming the hydrogel polymer, the concentration of the water-soluble ethylenically unsaturated monomer included in the monomer composition may be 40% by weight to 60% by weight, or 40% by weight to 50% by weight. If the concentration of the monomer is excessively low, the yield of the superabsorbent polymer may be low, and there may be a problem in terms of economic efficiency. In contrast, if the concentration is excessively high, it may produce problems in the processes, for example, a part of the monomer may be precipitated, the pulverization efficiency may be lowered during pulverization of the polymerized hydrogel polymer, etc., and the physical properties of the superabsorbent polymer may be deteriorated.

In addition, the monomer composition may further include a polymerization initiator generally used for preparing a superabsorbent polymer.

Specifically, the polymerization initiator that can be used herein includes a thermal polymerization initiator or a photopolymerization initiator by UV irradiation, depending on the polymerization method. However, even in the case of using the photopolymerization method, because a certain amount of heat is generated by the ultraviolet irradiation or the like and a certain degree of heat is generated according to the progress of the exothermic polymerization reaction, a thermal polymerization initiator may be additionally included.

The photopolymerization initiator can be used without any limitation as long as it is a compound capable of forming a radical by light such as a UV ray.

The photopolymerization initiator may include, for example, at least one initiator selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal Lucirin TPO, namely, 2,4,6-trimethyl-benzoyl-trimethyl phosphine oxide. More various photopolymerization initiators are well disclosed in "UV Coatings: Basics, Recent Developments and New Application" written by Reinhold Schwalm, (Elsevier, 2007), p 115, however the photopolymerization initiator is not limited to the above-described examples.

The photopolymerization initiator may be contained in the concentration of about 0.01% to about 1.0% by weight based on the monomer mixture. When the concentration of the photopolymerization initiator is excessively low, the polymerization rate may become slow, and when the concentration of the photopolymerization initiator is excessively high, the molecular weight of the superabsorbent polymer becomes small and its physical properties may become uneven.

Further, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), and the like, and examples of the azo-based initiator may include 2,2-azobis-(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane] dihydrochloride, 4,4-azobis-(4-cyanovaleric acid), and the like. More various thermal polymerization initiators are well disclosed in "Principle of Polymerization" written by Odian, (Wiley, 1981), p 203, however the thermal polymerization initiator is not limited to the above-described examples.

The thermal polymerization initiator can be included in the concentration of about 0.001% to about 0.5% by weight based on the monomer mixture. When the concentration of the thermal polymerization initiator is excessively low, additional thermal polymerization hardly occurs and thus effects due to the addition of the thermal polymerization initiator may be insignificant, and when the concentration of the thermal polymerization initiator is excessively high, the molecular weight of the superabsorbent polymer becomes small and the physical properties may become uneven.

Further, the type of the internal crosslinking agent included in the monomer composition is as described above, and such an internal crosslinking agent can crosslink the polymerized polymer. In particular, as the internal crosslinking agent is used in an amount of about 0.03 parts by weight or greater, or about 0.03 parts by weight to 0.6 parts by weight based on 100 parts by weight of the above-described monomer, for example, an acrylic acid in an un-neutralized state, it is possible to prepare a superabsorbent polymer appropriately satisfying the physical properties of one embodiment already described.

In addition, the monomer mixture may further include additives such as an emulsifier, a thickener, a plasticizer, a preservation stabilizer, an antioxidant, etc., if necessary. Specific examples of the additives are not limited, and various types of additives known in the art can be used without particular limitation. However, examples of the emulsifier include fatty acid esters containing saccharides, and more specifically, sucrose esters.

The raw materials such as the water-soluble ethylenically unsaturated monomer, silicate-based particles, photopolymerization initiator, thermal polymerization initiator, internal crosslinking agent, and additives described above can be prepared in the form of a monomer composition solution dissolved in a solvent.

The solvent that can be used herein is not limited as long as it can dissolve the above-described components. For example, one or more solvents selected from the group consisting of water, ethanol, ethylene glycol, diethylene glycol, triethylene glycol, 1,4-butanediol, propylene glycol, ethylene glycol monobutylether, propylene glycol monomethylether, propylene glycol monomethylether acetate, methylethylketone, acetone, methylamylketone, cyclohexanone, cyclopentanone, diethylene glycol monomethylether, diethylene glycol ethyl ether, toluene, xylene, butyrolactone, carbitol, methyl cellosolve acetate, N,N-dimethyl acetamide, and so on may be used in combination.

The solvent may be included in a residual amount excluding the above-described components from the total weight of the monomer mixture.

Meanwhile, the method for forming a hydrogel polymer by the thermal polymerization or photopolymerization of the monomer mixture is not particularly limited as long as it is a polymerization method commonly used in the art.

Specifically, the polymerization method is largely divided into thermal polymerization and photopolymerization. The common thermal polymerization may be carried out in a reactor like a kneader equipped with agitating spindles, and the photo-polymerization may be carried out in a reactor equipped with a movable conveyor belt. The above-described polymerization method is merely an example, and the present invention is not limited to the polymerization method described above.

As one example, the hydrogel polymer, which is obtained by supplying hot air to a reactor such as such as a kneader having an agitating shaft or heating the reactor to perform thermal polymerization as described above, and is discharged from the outlet of the reactor, may have a size of a few centimeters or a few millimeters, depending on the type of the agitating spindles equipped in the reactor. Specifically, the size of the hydrogel polymer obtained may vary depending on the concentration of the monomer mixture injected thereto, the injection rate, or the like, and the hydrogel polymer having a weight average particle diameter of 2 mm to 50 mm can be generally obtained.

Further, as described above, when the photopolymerization is carried out in a reactor equipped with a movable conveyor belt, the form of the hydrogel polymer commonly obtained may be a sheet-like hydrogel polymer having a width of the belt. Herein, although the thickness of the polymer sheet may vary depending on the concentration and the injection rate of the monomer composition to be injected, it is usually preferable to supply the monomer composition so that a sheet-like polymer having a thickness of about 0.5 cm to about 5 cm may be obtained. If the monomer composition is supplied to such an extent that the thickness of the sheet-like polymer is too thin, the production efficiency is low which is undesirable. If the thickness of the sheet-like polymer exceeds 5 cm, the polymerization reaction may not occur uniformly over the entire thickness, due to the excessively thick thickness.

In this case, the hydrogel polymer obtained by such method may typically have a moisture content of about 40% to about 80% by weight. The term "moisture content" as used herein refers to the content of moisture in the total weight of the hydrogel polymer, which is obtained by subtracting the weight of the dried polymer from the weight of the hydrogel polymer. Specifically, it is defined as a value calculated by measuring the weight loss according to evaporation of water in the polymer during the drying process by increasing the temperature of the polymer through infrared heating. In this case, the moisture content is measured under the drying conditions where the temperature is increased from room temperature to 180° C. and then the temperature is maintained at 180° C. and the total drying time is set to 20 minutes, including 5 minutes for the temperature rising step.

After the monomer is subjected to crosslinking polymerization, the base polymer powder can be obtained through drying, pulverization, classification, etc., and through a process such as pulverization and classification, the base polymer powder and the superabsorbent polymer obtained therefrom are suitably manufactured and provided so as to have a particle diameter of about 150 μm to 850 μm. More specifically, at least about 95% by weight or more of the base polymer powder and the superabsorbent polymer obtained therefrom has a particle diameter of about 150 μm to 850 μm and the fine particles having a particle diameter of less than about 150 μm can be less than about 3% by weight.

As such, as the particle diameter distribution of the base polymer powder and the superabsorbent polymer is adjusted to the preferable range, the superabsorbent polymer finally produced can exhibit excellent absorbent properties.

The method of drying, pulverization, and classification will be described in more detail below.

First, when drying the hydrogel polymer, a coarsely pulverizing step may be further carried out before drying in order to increase the efficiency of the drying step, if necessary.

Specifically, the step of course pulverization can be carried out at a temperature of 50° C. or greater, 50° C. to 150° C., or 60° C. to 100° C., and a frequency of 15 Hz or greater, 15 Hz to 40 Hz, or 15 Hz to 30 Hz. The temperature of the pulverization step may be the temperature of the pulverization machine, pulverization blade, or an external heat source, and the frequency may be the frequency of the pulverization machine or the pulverization blade.

Further, the preparation method of the superabsorbent polymer may further include, before or after the course pulverization, a step of adding water in an amount of less than 20 parts by weight, 0 parts by weight to 19 parts by weight, or 10 parts by weight to 19 parts by weight, based on 100 parts by weight of the hydrogel polymer. In the step of adding water, the water refers to ionized water, and if the amount of water is 20 parts by weight or greater based on 100 parts by weight of the crosslinked polymer, the physical properties of the superabsorbent polymer may be deteriorated, for example, the retention capacity may be deteriorated, and the bulk density of the superabsorbent polymer to be prepared may be reduced, thereby reducing storage efficiency.

A pulverizing machine used herein may include, but is not limited to, any one selected from the group consisting of a vertical pulverizer, a turbo cutter, a turbo grinder, a rotary cutter mill, a cutter mill, a disc mill, a shred crusher, a crusher, a chopper, and a disc cutter.

In this case, the coarsely pulverizing step may be carried out so that the particle diameter of the hydrogel polymer becomes about 2 mm to about 10 mm. Pulverizing the hydrogel polymer to a particle diameter of less than 2 mm is technically not easy due to its high moisture content, and agglomeration may occur between the pulverized particles. However, if the polymer is pulverized to a particle diameter of greater than 10 mm, the effect of increasing the efficiency in the subsequent drying step may be insignificant.

The hydrogel polymer coarsely pulverized as above or the hydrogel polymer immediately after polymerization without the coarsely pulverizing step is subjected to a drying step. In this case, the drying temperature of the drying step may be about 150° C. to about 250° C. When the drying temperature is less than 150° C., it is likely that the drying time would become too long or the physical properties of the finally formed superabsorbent polymer would be deteriorated, and when the drying temperature is greater than 250° C., only the surface of the polymer is dried, and thus it is likely that fine powder would be generated during the subsequent pulverizing step and that the physical properties of the finally formed superabsorbent polymer would be deteriorated. Accordingly, the drying may be preferably carried out at a temperature of about 150° C. to about 200° C.

Meanwhile, the drying time may be about 20 to about 90 minutes, in consideration of the process efficiency and the like, but it is not limited thereto.

In the drying step, the drying method may also be selected and used without any limitation if it is a method generally used for drying a hydrogel polymer. Specifically, the drying step may be carried out by a method such as hot air supply, infrared irradiation, microwave irradiation, and ultraviolet irradiation. When the drying step as above is finished, the moisture content of the polymer may be about 0.1% to about 10% by weight.

The polymer powder obtained through the pulverizing step may have a particle diameter of about 150 μm to about 850 μm. Specific examples of a pulverizing device that can be used to achieve the above particle diameter may include a pin mill, a hammer mill, a screw mill, a roll mill, a disc mill, a jog mill, and the like, but the present invention is not limited thereto.

Further, in order to control the physical properties of the superabsorbent polymer powder that is finally commercialized after the pulverization step, a separate step of classifying the polymer powder obtained after the pulverization depending on the particle diameter may be undertaken. Preferably, a polymer having a particle diameter of about 150 μm to about 850 μm is classified and only the polymer powder having such a particle diameter is subjected to the surface crosslinking reaction and finally commercialized. Since the particle diameter distribution of the base polymer powder obtained through such a process has already been described above, a further detailed description thereof will be omitted.

Meanwhile, the preparation method of still another embodiment may provide a method for preparing a superabsorbent polymer including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a speed of 1000 rpm or greater, to prepare a hydrogel polymer; and drying, pulverizing, and classifying the hydrogel polymer to form a base polymer powder, wherein the concentration of the water-soluble ethylenically unsaturated monomer contained in the monomer composition is 40% by weight to 60% by weight, wherein the step of drying, pulverizing, and classifying the hydrogel polymer to form a base polymer powder includes a course pulverization step of pulverizing the hydrogel polymer so that the diameter thereof is 2 mm to 10, and wherein the course pulverization step is carried out a temperature of 50° C. or greater and at a frequency of 15 Hz or greater.

Further, the preparation method of still another embodiment may provide a method for preparing a superabsorbent polymer including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a speed of 1000 rpm or greater, to prepare a hydrogel polymer; and drying, pulverizing, and classifying the hydrogel polymer to form a base polymer powder, wherein the concentration of the water-soluble ethylenically unsaturated monomer contained in the monomer composition is 40% by weight to 60% by weight, and wherein the method includes a course pulverization step of pulverizing the hydrogel polymer so that the diameter thereof is 2 mm to 10 mm, and further includes, before or after the course pulverization, a step of adding water in an amount of less than 20 parts by weight based on 100 parts by weight of the hydrogel polymer.

The preparation method of still another embodiment may provide a method for preparing a superabsorbent polymer including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a speed of 1000 rpm or greater, to prepare a hydrogel polymer; and drying, pulverizing, and classifying the hydrogel polymer to form a base polymer powder, wherein the step of drying, pulverizing, and classifying the hydrogel polymer to form a base polymer powder includes a course pulverization step of pulverizing the hydrogel polymer so that the particle diameter thereof is 2 mm to 10 mm, wherein the course pulverization step is carried out at a temperature of 50° C. or greater and a frequency of 15 Hz or greater, and wherein the method includes, before or after the course pulverization, a step of adding water in an amount of less than 20 parts by weight based on 100 parts by weight of the hydrogel polymer.

The preparation method of still another embodiment may provide a method for preparing a superabsorbent polymer including the steps of: crosslinking a monomer composition which contains a layered silicate-based particle, a foaming agent, an internal crosslinking agent, and a water-soluble ethylenically unsaturated monomer having an acidic group in which at least a part thereof is neutralized, and which is stirred at a speed of 1000 rpm or greater, to prepare a hydrogel polymer, and drying, pulverizing, and classifying the hydrogel polymer to form a base polymer powder, wherein the concentration of the water-soluble ethylenically unsaturated monomer contained in the monomer composition is 40% by weight to 60% by weight, wherein the step of drying, pulverizing, and classifying the hydrogel polymer to form a base polymer powder includes a course pulverization step of pulverizing the hydrogel polymer so that the particle diameter thereof is 2 mm to 10 mm, wherein the course pulverization step is carried out a temperature of 50° C. or greater and a frequency of 15 Hz or greater, and wherein the method includes, before or after the course pulverization, a step of adding water in an amount of less than 20 parts by weight based on 100 parts by weight of the hydrogel polymer.

The superabsorbent polymer obtained according to the above-described preparation method can exhibit excellent properties in which physical properties such as retention capacity, absorption rate, etc. are improved together and can exhibit excellent physical properties that can be suitably used for sanitary products such as diapers or the like.

Specifically, the superabsorbent polymer obtained by the method for preparing a superabsorbent polymer of still another embodiment may have a bulk density (B/D) of 0.55 g/ml or greater, 0.55 g/ml to 1.0 g/ml, or 0.55 g/ml to 0.70 g/ml. If the bulk density of the superabsorbent polymer is excessively reduced to less than 0.55 g/ml, the volume of the superabsorbent polymer is relatively increased and thus more storage space is required, which may lead to a reduction in storage efficiency. In addition, when the superabsorbent polymer is applied to a manufacturing process of a diaper or the like, the superabsorbent polymer particles are stagnated without being smoothly injected, thereby reducing the efficiency of the process.

Advantageous Effects

According to the present invention, a superabsorbent polymer having an improved absorption rate and a high bulk density, and a preparation method thereof, may be provided.

BRIEF DESCRIPTION OF DRAWINGS

FIG. 1 schematically shows the structure of the unit crystals of the layered silicate-based particles used in examples.

DETAILED DESCRIPTION OF THE EMBODIMENTS

The present invention will now be described in more detail by way of examples. However, these examples are only for illustrative purposes, and the scope of the present invention is not limited by these examples.

Examples 1 and 2 and Comparative Examples 1 and 2: Preparation of Superabsorbent Polymer with Different Post-Addition Amounts of the Additives Example 1

0.18 g of bis(2,4,6-trimethylbenzoyl)-phenylphosphine oxide [IRGACURE 819] was added as a photopolymerization initiator to 226 g of acrylic acid and mixed for 5 minutes. Then, 4.1 g of polyethylene glycol diacrylate (Miramer M280) was added as a crosslinking agent thereto and mixed for 10 minutes to prepare a monomer solution.

1.6 g of Laponite RD was added as silicate-based particles to 155 g of ionized water and mixed for 30 minutes. Thereafter, 1.7 g of sodium persulfate was added as a thermal polymerization initiator thereto and dissolved in ionized water until completely dissolved. Then, 8.8 g of sodium bicarbonate was added as a foaming agent and mixed for 10 minutes to prepare a mixed aqueous solution.

192 g of ionized water was mixed with 661 g of 32% caustic soda (NaOH) to prepare a caustic soda solution.

483 g of acrylic acid was added to a 2 L-dual jacketed glass reactor, through which cooling water flowed at 20° C., and 54.7 g of the monomer solution was added thereto and mixed for 5 minutes. Then, the mixture was neutralized by introducing the caustic soda solution for 10 minutes. The temperature was raised to about 65° C. by neutralization heat, and the mixture was allowed to stand until it was cooled to 46° C. Then, 40.8 g of the mixed aqueous solution was added and mixed for 1 minute. Subsequently, the mixture was stirred by using a dynamic mechanical system (DMS) at a rate of 6000 rpm for a motor and 6900 rpm for a stirrer to prepare a monomer composition.

The monomer composition was introduced into a feeder of a polymerization reactor consisting of a continuously moving conveyor belt, was irradiated with ultraviolet rays for 1 minute (irradiation amount: 2 mW/cm$^2$) with a UV irradiator having intensity of 10 mW, was allowed to stand for 2 minutes, and was then cut to a size of 5 cm*5 cm, and then 100 g of ionized water (18.6 PHR) was added thereto and absorbed to obtain a hydrogel polymer.

The hydrogel polymer was transferred to a cutting machine and then pulverized under conditions of 25° C. and 15.8 Hz. Subsequently, the pulverized hydrogel polymer was dried in a hot air dryer at 180° C. for 40 minutes, and the dried hydrogel polymer was pulverized with a hammer mill pulverizer. A polymer having a particle size (average particle size) of 150 μm to 850 μm was then classified using a sieve, and a polymer having a particle size (average particle size) of 300 μm to 600 μm was then classified to prepare a superabsorbent polymer.

Example 2

A superabsorbent polymer was prepared in the same manner as in Example 1, except that no ionized water was added during the preparation of the hydrogel polymer.

Comparative Example 1

A superabsorbent polymer was prepared in the same manner as in Example 1, except that 195 g (36.7 PHR) of ionized water was added during the preparation of the hydrogel polymer.

Comparative Example 2

A superabsorbent polymer was prepared in the same manner as in Example 1, except that 145 g (27.0 PHR) of ionized water was added during the preparation of the hydrogel polymer.

Examples 3 to 5 and Comparative Example 3: Preparation of Superabsorbent Polymer with Different Monomer Concentrations Example 3

0.45 g of bis(2,4,6-trimethylbenzoyl)-phenylphosphine oxide [IRGACURE 819] as a photopolymerization initiator was added to 213.5 g of acrylic acid and mixed for 5 minutes to prepare a photoinitiator solution.

0.38 g of sucrose ester (Ryoto s-1670) was added to 150.3 g of acrylic acid, and then 10.8 g of polyethylene glycol diacrylate (Mw=508) [Miramer M280] was added as a crosslinking agent and mixed for 10 minutes to prepare a crosslinking agent solution.

1.9 g of Laponite RD was added as silicate-based particles to 154.7 g of ionized water and mixed for 30 minutes. Then, 3.5 g of sodium bicarbonate was added as a foaming agent and mixed for 10 minutes to prepare a mixed aqueous solution.

14.7 g of sodium persulfate was added as a thermal polymerization initiator to 132.6 g of ionized water and dissolved in ionized water until completely dissolved to prepare a thermal polymerization initiator solution.

117 g of ionized water was mixed with 624 g of 32% caustic soda (NaOH) to prepare a caustic soda solution.

428 g of acrylic acid was added to a 2 L-dual jacketed glass reactor, through which cooling water flowed at 20° C., and 17.5 g of the photoinitiator solution and 15.8 g of the crosslinking agent solution were added thereto and mixed for 5 minutes. The mixture was then neutralized by introducing the caustic soda solution for 10 minutes. The temperature was raised to about 65° C. by neutralization heat, and the mixture was allowed to stand until it was cooled to 46° C. Then, 9.2 g of the thermal initiator solution and 38.1 g of the foaming agent solution were added and mixed for 1 minute. The mixture was then stirred by using a dynamic mechanical system (DMS) at a rate of 6000 rpm for a pump motor and 6900 rpm for a stirrer to prepare a monomer composition. Herein, the concentration of the monomers included in the monomer composition was 45.9% by weight.

The monomer composition was introduced into a feeder of a polymerization reactor consisting of a continuously moving conveyor belt, irradiated with ultraviolet rays for 1 minute (irradiation amount: 2 mW/cm$^2$) with a UV irradiator having intensity of 10 mW, allowed to stand for 2 minutes, and then cut into a size of 5 cm*5 cm, and then 40 g of ionized water was added thereto and absorbed to obtain a hydrogel polymer.

The hydrogel polymer was transferred to a cutting machine and then pulverized under conditions of 80° C. and 25 Hz. Then, the pulverized hydrogel polymer was dried in a hot air dryer at 180° C. for 40 minutes, and the dried hydrogel polymer was pulverized with a hammer mill pulverizer. A polymer having a particle size (average particle size) of 150 μm to 850 μm was then classified using a sieve, and a polymer having a particle size (average particle size) of 300 μm to 600 μm was classified again to prepare a superabsorbent polymer.

Example 4

0.43 g of bis(2,4,6-trimethylbenzoyl)-phenylphosphine oxide [IRGACURE 8191] was added as a photopolymerization initiator to 204.8 g of acrylic acid and mixed for 5 minutes to prepare a photoinitiator solution.

0.36 g of sucrose ester (Ryoto s-1670) was added to 144.2 g of acrylic acid, and then 10.4 g of polyethylene glycol diacrylate (Mw=508) [Miramer M280] was added as a crosslinking agent and mixed for 10 minutes to prepare a crosslinking agent solution.

1.9 g of Laponite RD was added as silicate-based particles to 148.4 g of ionized water and mixed for 30 minutes. Then, 3.3 g of sodium bicarbonate was added as a foaming agent and mixed for 10 minutes to prepare a mixed aqueous solution.

14.1 g of sodium persulfate was added as a thermal polymerization initiator to 127.2 g of ionized water and completely dissolved in ionized water to prepare a thermal polymerization initiator solution.

163.4 g of ionized water was mixed to 598.5 g of 32% caustic soda (NaOH) to prepare a caustic soda solution.

410.7 g of acrylic acid was added to a 2 L-dual jacketed glass reactor, through which cooling water flowed at 20° C., and 16.8 g of the photoinitiator solution and 15.2 g of the crosslinking agent solution were added thereto and mixed for 5 minutes. Then, the mixture was neutralized by introducing the caustic soda solution for 10 minutes. The temperature was raised to about 65° C. by neutralization heat, and the mixture was allowed to stand until it was cooled to 46° C. Then, 8.8 g of the thermal initiator solution and 36.6 g of the foaming agent solution were added and mixed for 1 minute. The mixture was then stirred by using a dynamic mechanical system (DMS) at a rate of 6000 rpm for a pump motor and 6900 rpm for a stirrer to prepare a monomer composition. Herein, the concentration of the monomers included in the monomer composition was 44% by weight.

The monomer composition was introduced into a feeder of a polymerization reactor consisting of a continuously moving conveyor belt, irradiated with ultraviolet rays for 1 minute (irradiation amount: 2 mW/cm$^2$) with a UV irradiator having intensity of 10 mW, allowed to stand for 2 minutes, and then cut into a size of 5 cm*5 cm, and then 40 g of ionized water (18.6 PHR) was added thereto and absorbed to obtain a hydrogel polymer.

The hydrogel polymer was transferred to a cutting machine and then pulverized under conditions of 80° C. and 25 Hz. Subsequently, the pulverized hydrogel polymer was dried in a hot air dryer at 180° C. for 40 minutes, and the dried hydrogel polymer was pulverized with a hammer mill pulverizer. A polymer having a particle size (average particle size) of 150 μm to 850 μm was classified using a sieve, and a polymer having a particle size (average particle size) of 300 μm to 600 μm was classified again to prepare a superabsorbent polymer.

Example 5

0.41 g of bis(2,4,6-trimethylbenzoyl)-phenylphosphine oxide [IRGACURE 819] was added as a photopolymerization initiator to 195.4 g of acrylic acid and mixed for 5 minutes to prepare a photoinitiator solution.

0.36 g of sucrose ester (Ryoto s-1670) was added to 137.6 g of acrylic acid, and then 9.9 g of polyethylene glycol diacrylate (Mw=508) [Miramer M280] was added as a crosslinking agent and mixed for 10 minutes to prepare a crosslinking agent solution.

2.2 g of Laponite RD was added as silicate-based particles to 175.4 g of ionized water and mixed for 30 minutes. Then, 3.9 g of sodium bicarbonate was added as a foaming agent and mixed for 10 minutes to prepare a mixed aqueous solution.

13.5 g of sodium persulfate was added as a thermal polymerization initiator to 121.4 g of ionized water and completely dissolved therein to prepare a thermal polymerization initiator solution.

212.9 g of ionized water was mixed with 571.2 g of 32% caustic soda (NaOH) to prepare a caustic soda solution.

392 g of acrylic acid was added to a 2 L dual jacketed glass reactor through which cooling water flowed at 20° C., and 16.1 g of the photoinitiator solution and 14.5 g of the crosslinking agent solution were added thereto and mixed for 5 minutes. Thereafter, the mixture was neutralized by introducing the caustic soda solution for 10 minutes. The temperature was raised to about 65° C. by neutralization heat, and the mixture was allowed to stand until it was cooled to 46° C. Then, 8.4 g of the thermal initiator solution and 34.9 g of the foaming agent solution were added and mixed for 1 minute. The mixture was then stirred by using a dynamic mechanical system (DMS) at a rate of 6000 rpm for a motor and 6900 rpm for a stirrer to prepare a monomer composition. Herein, the concentration of the monomers included in the monomer composition was 42% by weight.

The monomer composition was introduced into a feeder of a polymerization reactor consisting of a continuously moving conveyor belt, irradiated with ultraviolet rays for 1 minute (irradiation amount: 2 mW/cm$^2$) with a UV irradiator having an intensity of 10 mW, allowed to stand for 2 minutes, and then cut into a size of 5 cm*5 cm, and then 40 g of ionized water was added thereto and absorbed to obtain a hydrogel polymer.

The hydrogel polymer was transferred to a cutting machine and then pulverized under conditions of 80° C. and 25 Hz. Subsequently, the pulverized hydrogel polymer was dried in a hot air dryer at 180° C. for 40 minutes, and the dried hydrogel polymer was pulverized with a hammer mill pulverizer. Then, a polymer having a particle size (average particle size) of 150 μm to 850 μm was classified using a sieve, and a polymer having a particle size (average particle size) of 300 μm to 600 μm was classified again to prepare a superabsorbent polymer.

Comparative Example 3

A superabsorbent polymer was prepared in the same manner as in Example 3, except that the concentration of the monomers included in the monomer composition during the preparation of the hydrogel polymer was adjusted to 39% by weight.

Examples 6 and 7 and Comparative Example 4: Preparation of Superabsorbent Polymer with Different Pulverization Rates Example 6

0.18 g of bis(2,4,6-trimethylbenzoyl)-phenylphosphine oxide [IRGACURE 819] as a photopolymerization initiator, and 0.44 g of sucrose ester (Ryoto s-1670) were added to 220.2 g of acrylic acid and mixed for 5 minutes, and then 4.0 g of polyethylene glycol diacrylate [Miramer M280] was added as a crosslinking agent and mixed to prepare a monomer solution.

1.6 g of Laponite RD was added as silicate-based particles to 155 g of ionized water and mixed for 30 minutes. Then, 4.4 g of sodium persulfate was added thereto as a thermal polymerization initiator and completely dissolved, and then 8.8 g of sodium bicarbonate was added as a foaming agent and mixed for 10 minutes to prepare a mixed aqueous solution.

192 g of ionized water was mixed to 661 g of 32% caustic soda (NaOH) to prepare a caustic soda solution.

483 g of acrylic acid was added to a 2 L dual jacketed glass reactor, through which cooling water flowed at 20 CC, and 54.8 g of the monomer solution was added and mixed for 5 minutes. Thereafter, the mixture was neutralized by introducing the caustic soda solution for 10 minutes. The temperature was raised to about 65° C. by neutralization heat, and the mixture was allowed stand until it was cooled to 46° C. Then, 41.4 g of the mixed aqueous solution was added and mixed for 1 minute. Thereafter, the mixture was stirred by using a dynamic mechanical system (DMS) at a rate of 6000 rpm for a pump motor and 6900 rpm for a stirrer to prepare a monomer composition.

The monomer composition was introduced into a feeder of a polymerization reactor consisting of a continuously moving conveyor belt, irradiated with ultraviolet rays for 1 minute (irradiation amount: 2 mW/cm$^2$) with a UV irradiator having an intensity of 10 mW, allowed to stand for 2 minutes, and then cut into a size of 5 cm*5 cm, and then 100 g of ionized water was added thereto and absorbed to obtain a hydrogel polymer.

The hydrogel polymer was transferred to a cutting machine and then pulverized under conditions of 90° C. and 25 Hz. Subsequently, the pulverized hydrogel polymer was dried in a hot air dryer at 180° C. for 40 minutes, and the dried hydrogel polymer was pulverized with a hammer mill pulverizer. Then, a polymer having a particle size (average particle size) of 150 μm to 850 μm was classified using a sieve, and a polymer having a particle size (average particle size) of 300 μm to 600 μm was classified again to prepare a superabsorbent polymer.

Example 7

0.18 g of bis(2,4,6-trimethylbenzoyl)-phenylphosphine oxide [IRGACURE 819] was added as a photopolymerization initiator to 225.5 g of acrylic acid and mixed for 5 minutes, and then 4.1 g of polyethylene glycol diacrylate [Miramer M280] was added as a crosslinking agent and mixed for 10 minutes to prepare a monomer solution.

1.6 g of Laponite RD was added as silicate-based particles to 155 g of ionized water and mixed for 30 minutes. Then, 1.7 g of sodium persulfate was added thereto as a thermal polymerization initiator and completely dissolved, and then 8.8 g of sodium bicarbonate was added as a foaming agent and mixed for 10 minutes to prepare a mixed aqueous solution.

192 g of ionized water was mixed with 661 g of 32% caustic soda (NaOH) to prepare a caustic soda solution.

483 g of acrylic acid was added to a 2 L dual jacketed glass reactor, through which cooling water flowed at 20° C., and 54.7 g of the monomer solution was added and mixed for 5 minutes. Then, the mixture was neutralized by introducing the caustic soda solution for 10 minutes. The temperature was raised to about 65° C. by neutralization heat, and the mixture was allowed to stand it was cooled to 46° C. Then, 40.8 g of the mixed aqueous solution was added and mixed for 1 minute. Thereafter, the mixture was stirred by using a dynamic mechanical system (DMS) at a rate of 6000 rpm for a pump motor and 6900 rpm for a stirrer to prepare a monomer composition.

The monomer composition was introduced into a feeder of a polymerization reactor consisting of a continuously moving conveyor belt, irradiated with ultraviolet rays for 1 minute (irradiation amount: 2 mW/cm$^2$) with a UV irradiator having an intensity of 10 mW, allowed to stand for 2 minutes, and then cut into a size of 5 cm*5 cm, and then 100 g of ionized water was added thereto and absorbed to obtain a hydrogel polymer.

The hydrogel polymer was transferred to a cutting machine and then pulverized under conditions of 90° C. and 15.8 Hz. Subsequently, the pulverized hydrogel polymer was dried in a hot air dryer at 180° C. for 40 minutes, and the dried hydrogel polymer was pulverized with a hammer mill pulverizer. Then, a polymer having a particle size (average particle size) of 150 μm to 850 μm was classified using a sieve, and a polymer having a particle size (average particle size) of 300 μm to 600 μm was classified again to prepare a superabsorbent polymer.

Comparative Example 4

A superabsorbent polymer was prepared in the same manner as in Example 6, except that the hydrogel polymer was pulverized under conditions of 90° C. and 10 Hz after transferring it to a cutting machine.

Experimental Examples: Measurement of Physical Properties of Superabsorbent Polymers Obtained in Examples and Comparative Examples The physical properties of the superabsorbent polymers prepared in the examples and comparative examples above were measured by the following methods, and the results thereof are shown in Tables 1 to 3.

Experimental Examples 1. Centrifuge Retention Capacity (CRC) for Physiological Saline Solution The centrifuge retention capacity (CRC) by water absorption capacity under a non-loading condition was measured for the superabsorbent polymers of the examples and comparative examples in accordance with EDANA (European Disposables and Nonwovens Association) recommended test method No. WSP 241.2.

That is, $W_0(g)$ (about 0.2 g) of the super absorbent polymers of the Examples and Comparative Examples were uniformly put in a nonwoven fabric-made bag, followed by sealing. Then, the bag was immersed in a physiological saline solution composed of a 0.9 wt % aqueous sodium chloride solution at room temperature. After 30 minutes, water was removed from the bag by centrifugation at 250 G for 3 minutes, and the weight $W_2(g)$ of the bag was then measured. Further, the same procedure was carried out without using the polymer, and then the resultant weight $W_1(g)$ was measured.

Using the respective weights thus obtained, CRC (g/g) was calculated according to the following Mathematical Formula 1, and thus, the centrifuge retention capacity was confirmed.

$$CRC(g/g)=\{[W_2(g)-W_1(g)]/W_0(g)\}-1 \quad \text{[Calculation Formula 1]}$$

In the above Calculation Formula 1, $W_0(g)$ is an initial weight (g) of the superabsorbent polymer, $W_1(g)$ is the weight of the device not including the super absorbent polymer, measured after dehydrating the same by using a centrifuge at 250 G for 3 minutes, and $W_2(g)$ is the weight of the device including the super absorbent polymer, measured after immersing and absorbing the super absorbent polymer into a 0.9 wt % physiological saline at room temperature for 30 minutes and then dehydrating the same by using a centrifuge at 250 G for 3 minutes.

Experimental Example 2. Extractable Content (EC)

The amounts of the extractable content for the superabsorbent polymers of the Examples and Comparative Examples were measured in accordance to EDANA method No. WSP 270.3.

Experimental Example 3. Absorption Rate
(Vortex-Test)

50 ml of a 0.9 wt % NaCl solution was added to a 100 ml beaker, and 2.00 g of each of the superabsorbent polymers according to the examples and comparative examples was added while stirring at 600 rpm using a stirrer. Then, the time until the vortex of the liquid caused by the stirring disappeared and a smooth surface was formed was measured.

Experimental Example 4. Bulk Density (B/D)

100 g of the superabsorbent polymers of the examples and comparative examples were flowed through a standard fluidity measuring device orifice and received in a container with a volume of 100 ml, the superabsorbent polymer was cut so as to be horizontal, and the volume of the superabsorbent polymer was adjusted to 100 ml. Then, the weight of only the superabsorbent polymer excluding the container was measured. The weight of only the superabsorbent polymer was then divided by 100 ml, which is the volume of the superabsorbent polymer, to obtain the bulk density corresponding to the weight of the superabsorbent polymer per unit volume.

Experimental Example 5. Moisture Content (%)

With respect to the hydrogel polymers obtained in the examples and comparative examples, the moisture content was obtained as a value calculated by measuring the weight loss according to evaporation of water in the polymer during the drying process through infrared heating. In this case, the drying conditions were set so that the temperature was increased from room temperature to 180° C. and then the temperature was maintained at 180° C., and the total drying time was 20 minutes, including 5 minutes for the temperature rising step.

TABLE 1

Experimental example results of superabsorbent polymers prepared in Examples 1 and 2 and Comparative Examples 1 and 2

| Category | Post-addition amount (PHR) | Centrifuge Retention Capacity (g/g) | Extractable content (%) | Absorption rate (s) | B/D (g/ml) | Moisture content (%) |
|---|---|---|---|---|---|---|
| Example 1 | 18.6 | 52.4 | 25.1 | 48 | 0.56 | 50.8 |
| Example 2 | 0 | 56.2 | 28.1 | 42 | 0.55 | 47.1 |
| Comparative Example 1 | 36.7 | 47.8 | 20.1 | 44 | 0.51 | 52.9 |
| Comparative Example 2 | 27.0 | 52.2 | 24.7 | 46 | 0.53 | 51.4 |

Example 2

As shown in Table 1, the superabsorbent polymers obtained in Examples 1 and 2 had a bulk density of 0.56 g/ml and 0.55 g/ml, respectively, confirming that the bulk density was increased compared to the superabsorbent polymers of Comparative Examples 1 and 2, which had a bulk density of 0.51 g/ml and 0.53 g/ml, respectively.

TABLE 2

Experimental example results of superabsorbent polymers prepared in Examples 3 to 5 and Comparative Example 3

| Category | Concentration of monomer composition (wt %) | Centrifuge Retention Capacity (g/g) | Extractable content (%) | Absorption rate (s) | B/D (g/ml) | Moisture content (%) |
|---|---|---|---|---|---|---|
| Example 3 | 45.9 | 42.2 | 18.1 | 47 | 0.59 | 47.4 |
| Example 4 | 44.0 | 45.2 | 18.6 | 54 | 0.58 | 50.4 |
| Example 5 | 42 | 49.5 | 22.8 | 52 | 0.56 | 52.5 |
| Comparative Example 3 | 39 | 52.0 | 24.3 | 50 | 0.54 | 54.1 |

As shown in Table 2, the superabsorbent polymers obtained in Examples 3 to 5 had a bulk density of 0.59 g/ml, 0.58 g/ml, and 0.56 g/ml, respectively, confirming that the bulk density was increased compared to the superabsorbent polymer of Comparative Example 3 which had a bulk density of 0.54 g/ml.

Meanwhile, when the concentration of the monomer composition was excessively increased to more than 45.9% by weight, precipitation occurred in the reactants during the neutralization process, and the polymerization of the superabsorbent polymers could not be carried out.

TABLE 3

Experimental example results of superabsorbent polymers prepared in Examples 6 and 7 and Comparative Example 4

| Category | Pulverization rate (Hz) | Centrifuge Retention Capacity (g/g) | Extractable content (%) | Absorption rate (s) | B/D (g/ml) | Moisture content (%) |
|---|---|---|---|---|---|---|
| Example 6 | 25 | 50.4 | 31.2 | 54 | 0.60 | 45.0 |
| Example 7 | 15.8 | 49.7 | 22.9 | 45 | 0.56 | 45.5 |
| Comparative Example 4 | 10 | 47.1 | 24.6 | 42 | 0.54 | 45.2 |

As shown in Table 3, the superabsorbent polymers obtained in Examples 6 and 7 had a high bulk density of 0.60 g/ml and 0.56 g/ml, respectively, confirming that the bulk density was increased compared to the superabsorbent polymer of Comparative Example 4, which had a bulk density of 0.54 g/ml.

The invention claimed is:

1. A superabsorbent polymer comprising
a base polymer powder containing a crosslinked polymer of a water-soluble ethylenically unsaturated monomer having an acidic group in which at least a part thereof is neutralized,
wherein a plurality of pores having a diameter of 1 μm or greater are formed in the base polymer powder,
wherein the crosslinked polymer has a crosslinked structure and comprises a layered silicate-based particle dispersed in the crosslinked structure, and
wherein the superabsorbent polymer has an bulk density of 0.55 g/ml or greater, and wherein the layered silicate-based particle has a columnar structure in which the maximum diameter of the orthogonal cross-section is 1 nm to 100 nm and the height is 0.01 nm to 20 nm.

2. The superabsorbent polymer of claim 1, wherein the plurality of pores having a diameter of 1 μm or greater formed in the base polymer powder comprise micropores having a diameter of 10 μm to 100 μm.

3. The superabsorbent polymer of claim 1, wherein a time required to remove a vortex generated by stirring 50 ml of a 0.9 wt % NaCl solution at a rate of 600 rpm at room temperature is 60 seconds or less.

4. The superabsorbent polymer of claim 1, wherein the layered silicate-based particle comprises a unit crystal which includes a metal oxide layer containing a metal oxide and a silica layer containing silica which is formed on at least one surface of the metal oxide layer.

5. The superabsorbent polymer of claim 1, wherein the layered silicate-based particle is contained in an amount of 0.01 parts by weight to 30 parts by weight based on 100 parts by weight of the base polymer powder.

6. The superabsorbent polymer of claim 1, wherein the water-soluble ethylenically unsaturated monomer comprises at least one selected from the group consisting of an anionic monomer of acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methylpropane sulfonic acid, and a salt thereof;
a nonionic hydrophilic monomer of (meth)acrylamide, N-substituted (meth)acrylate, 2-hydroxyethyl(meth) acrylate, 2-hydroxypropyl(meth)acrylate, methoxypolyethylene glycol (meth)acrylate, or polyethylene glycol (meth)acrylate; and
an unsaturated monomer containing an amino group of (N,N)-dimethylaminoethyl(meth)acrylate or (N,N)-dimethylaminopropyl(meth)acrylamide, and a quaternary compound thereof.

7. The superabsorbent polymer of claim 1, wherein the crosslinked polymer comprises a crosslinked structure in which polymer chains of the water-soluble ethylenically unsaturated monomer are crosslinked through a cross-linkable functional group of an internal crosslinking agent.

8. The superabsorbent polymer of claim 1, wherein the crosslinked polymer comprises a crosslinked polymer which is polymerized in the presence of an internal crosslinking agent containing a polyfunctional acrylate-based compound having the water-soluble ethylenically unsaturated monomer having a plurality of ethylene oxide groups.

9. The superabsorbent polymer of claim 7, wherein the internal crosslinking agent comprises at least one selected from the group consisting of polyethylene glycol diacrylate (PEGDA), glycerin diacrylate, glycerin triacrylate, unmodified or ethoxylated trimethylolpropane triacrylate (TMPTA), hexanediol diacrylate, and triethylene glycol diacrylate.

10. A method for preparing the superabsorbent polymer of claim 1, comprising the steps of:
crosslinking a monomer composition which contains the layered silicate-based particle, a foaming agent, an internal crosslinking agent, and the water-soluble ethylenically unsaturated monomer having an acidic group in which at least a part thereof is neutralized, and which is stirred at a rate of 1000 rpm or greater, to prepare a hydrogel polymer; and
drying, pulverizing, and classifying the hydrogel polymer to form a base polymer powder,
wherein a concentration of the water-soluble ethylenically unsaturated monomer contained in the monomer composition is 40% by weight to 60% by weight.

11. A method for preparing the superabsorbent polymer of claim 1, comprising the steps of:
crosslinking a monomer composition which contains the layered silicate-based particle, a foaming agent, an internal crosslinking agent, and the water-soluble ethylenically unsaturated monomer having an acidic group in which at least a part thereof is neutralized, and which is stirred at a rate of 1000 rpm or greater to prepare a hydrogel polymer; and
drying, pulverizing, and classifying the hydrogel polymer to form a base polymer powder, wherein the step of drying, pulverizing, and classifying the hydrogel polymer to form a base polymer powder comprises a course pulverization step of pulverizing the hydrogel polymer so that the particle diameter thereof is 2 mm to 10 mm, and wherein the course pulverizing step is carried out at a temperature of 50° C. or greater and a frequency of 15 Hz or greater.

12. A method for preparing the superabsorbent polymer of claim 1, comprising the steps of:

crosslinking a monomer composition which contains the layered silicate-based particle, a foaming agent, an internal crosslinking agent, and the water-soluble ethylenically unsaturated monomer having an acidic group in which at least a part thereof is neutralized, and which is stirred at a speed of 1000 rpm or greater, to prepare a hydrogel polymer; and drying, pulverizing, and classifying the hydrogel polymer to form a base polymer powder, wherein the step of drying, pulverizing, and classifying the hydrogel polymer to form a base polymer powder comprises a course pulverization step of pulverizing the hydrogel polymer so that the diameter thereof is 2 mm to 10 mm, and wherein the method further comprises, before or after the course pulverization, a step of adding water in an amount of less than 20 parts by weight based on 100 parts by weight of the hydrogel polymer.

13. The method for preparing a superabsorbent polymer of claim 10, wherein the layered silicate-based particle is used in an amount of 1 to 50 parts by weight based on 100 parts by weight of the foaming agent.

14. The method for preparing a superabsorbent polymer of claim 10, wherein the foaming agent comprises at least one selected from the group consisting of azodicarbonamide, azodicarboxylamide, benzenesulfonyl hydrazide, dinitrosopentamethylenetetramine, toluenesulfonyl hydrazide, azobisisobutyronitrile, barium azodicarboxylate, and sodium bicarbonate.

15. The superabsorbent polymer of claim 8, wherein the internal crosslinking agent comprises at least one selected from the group consisting of polyethylene glycol diacrylate (PEGDA), glycerin diacrylate, glycerin triacrylate, unmodified or ethoxylated trimethylolpropane triacrylate (TMPTA), hexanediol diacrylate, and triethylene glycol diacrylate.

16. The method for preparing a superabsorbent polymer of claim 11, wherein the layered silicate-based particle is used in an amount of 1 to 50 parts by weight based on 100 parts by weight of the foaming agent.

17. The method for preparing a superabsorbent polymer of claim 12, wherein the layered silicate-based particle is used in an amount of 1 to 50 parts by weight based on 100 parts by weight of the foaming agent.

18. The method for preparing a superabsorbent polymer of claim 11, wherein the foaming agent comprises at least one selected from the group consisting of azodicarbonamide, azodicarboxylamide, benzenesulfonyl hydrazide, dinitrosopentamethylenetetramine, toluenesulfonyl hydrazide, azobisisobutyronitrile, barium azodicarboxylate, and sodium bicarbonate.

19. The method for preparing a superabsorbent polymer of claim 12, wherein the foaming agent comprises at least one selected from the group consisting of azodicarbonamide, azodicarboxylamide, benzenesulfonyl hydrazide, dinitrosopentamethylenetetramine, toluenesulfonyl hydrazide, azobisisobutyronitrile, barium azodicarboxylate, and sodium bicarbonate.

* * * * *